United States Patent [19]

Ohmura

[11] 4,215,504
[45] Aug. 5, 1980

[54] LINE GUIDE FOR A FISHING ROD

[75] Inventor: Ryuichi Ohmura, Shizuoka, Japan

[73] Assignee: Fuji Kogyo K.K., Japan

[21] Appl. No.: 921,712

[22] Filed: Jul. 3, 1978

[30] Foreign Application Priority Data

Jul. 7, 1977 [JP] Japan .................. 52-89932[U]

[51] Int. Cl.² .............................................. A01K 87/04
[52] U.S. Cl. ................................................... 43/24
[58] Field of Search ................... 43/24; 242/157 R; 254/190 R, 190 D

[56] References Cited

U.S. PATENT DOCUMENTS

| D. 108,720 | 3/1938 | Morgan | 43/24 |
| 1,781,569 | 11/1930 | Cook | 43/24 |
| 3,690,027 | 9/1972 | Ohmura | 43/24 |
| 4,011,680 | 3/1977 | Rienzo | 43/24 |

FOREIGN PATENT DOCUMENTS

| 28430 | of 1907 | United Kingdom | 43/24 |
| 14281 | of 1912 | United Kingdom | 43/24 |
| 1080514 | 8/1967 | United Kingdom | 43/24 |
| 1181221 | 2/1970 | United Kingdom | 43/24 |
| 1364789 | 8/1974 | United Kingdom | 43/24 |

Primary Examiner—Nicholas P. Godici
Attorney, Agent, or Firm—Hill, Van Santen, Steadman, Chiara & Simpson

[57] ABSTRACT

A line guide for a fishing rod comprises a guide ring structure defining a path for the line and a supporting frame for supporting the ring with respect to the fishing rod. The supporting frame has legs projecting from the ring structure and substantially embracing the line path beyond the ring structure so as to enable the legs to shield the latter against impacts during use of the rod.

4 Claims, 3 Drawing Figures

LINE GUIDE FOR A FISHING ROD

BACKGROUND OF THE INVENTION

1. Field of the Invention

This invention relates to improvements in a line guide to be attached to a fishing rod along its length or at its top end.

2. Prior Art

Line guides of a known type are provided with a ring adapted to permit the fishing line to run guidably therethrough along the rod so that the line can be reeled in and out without getting entangled with the rod or other objects.

Various line guides for fishing rods are known, which essentially comprise ring members and supporting frames for attachment of the ring to the rods. Since such a guide ring is disposed in elevated position relative to the rod, it is exposed so that it could be subjected to external force and impact and is consequently liable to damage. This condition is particularly true where the line guide has a dual ring construction in which an inner line guide ring is mounted within an outer ring formation with a tight fit, creating high tension at their joint.

SUMMARY OF THE INVENTION

With the foregoing difficulties of the prior art in view, the present invention provides an improved line guide for a fishing rod which incorporates a certain support-leg configuration which protects the guide ring against damaging impacts during use of the rod.

The above object and other features of the invention will be more apparent from the following description taken in connection with the accompanying drawings illustrating a preferred embodiment of the invention.

DETAILED DESCRIPTION OF THE PREFERRED EMBODIMENT

Figure 1:
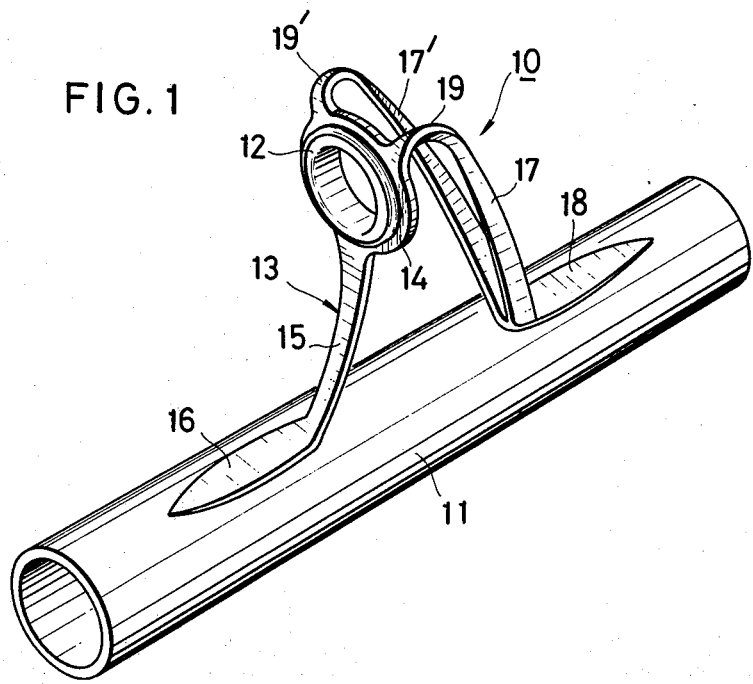
FIG. 1 is a perspective view of a line guide according to the invention shown mounted on a portion of a fishing rod.

FIG. 1 shows a line guide 10 for a fishing rod 11 constructed in accordance with the invention.

The line guide 10 comprises a guide ring 12 defining a path for the line and made of any known hard material and a supporting frame 13 of a suitable resilient hard metal for supporting the guide ring 12 with respect to the fishing rod 11. The supporting frame 13 has a jacketing or surrounding ring 14 dimensioned so that the guide ring 12 fits tightly thereinto. A single supporting leg 15 extends downwardly, i.e. toward the rod 11, from the lower peripheral portion of the jacketing or surrounding ring 14. It also has an extent in the direction of the stem or handle (not shown) of the rod, and is slightly inwardly bent or curved as better shown in FIG. 2. The single supporting leg 15 has an integral foot 16 adapted for attachment of the line guide 10 to the rod 11, for which purpose the foot 16 is preferably slightly curved in cross section so as to conform to the peripheral shape of the rod 11.

Figure 2:
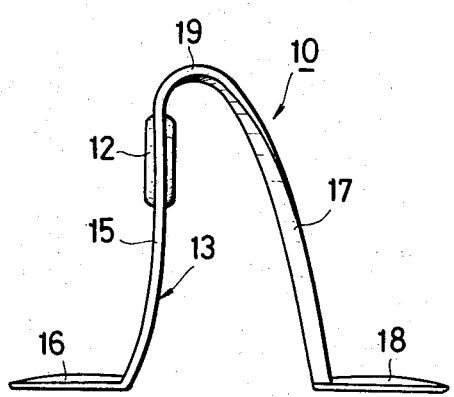
FIG. 2 is a side view of the line guide.

The line guide 10 is further provided with a pair of bifurcated or forked legs 17,17' extending from the upper portion of the jacketing ring 14 toward the rod 11 and converging toward each other to form a single attachment foot 18, this foot being substantially the same in construction and function as the aforesaid foot 16. The feet 16 and 18 may be secured to the rod 11 adhesively or by winding wires thereon. The bifurcated legs 17,17' are each bent slightly outwardly as shown in FIG. 2. The slight "inward" curvature of the leg 15 is convexly directed toward the legs 17, 17', and the slight "outward" curvature of the legs 17, 17' is concavely directed toward the jacketing ring 14.

Figure 3:
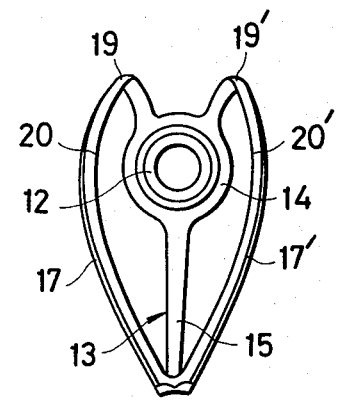
FIG. 3 is a front elevational view of the line guide.

According to an important aspect of the invention, each of the bifurcated legs 17,17' has an integral rise portion 19,19' projecting upwardly radially from and above the top of the jacketing ring 14 and these portions diverge laterally away from each other at least along the portions of their length which are coextensive with the jacketing ring 14, so as to project outwardly, i.e. away from the path of the line as at 20,20' beyond the region or extent of the ring 14, as shown in FIG. 3. This supporting frame construction provides a protective shield for the rings 12 and 14 to safeguard the latter against damage during use of the fishing rod 11. When casting using the rod 11, the line guide 10 may hit rocks on the seashore or other potentially damage-causing objects, in which instance the resulting impact is received and absorbed by the projecting bifurcated legs 17,17' which are per se resilient.

A preferred method of forming the supporting frame 13 is to punch it out in one piece from sheet metal.

To further increase the mechanical strength of the supporting frame 13, each of the bifurcated legs 17,17' may be twisted inwardly progressively for approximately 90°, as disclosed in U.S. Pat. No. 4,176,488.

Having thus described the invention, it will be understood that various changes and modifications may be made in the specific form and construction herein shown and described, without departing from the scope of the appended claims.

What is claimed is:

1. A line guide for a fishing rod, comprising:
   (a) A guide ring defining a path for the line; and
   (b) A supporting frame including
      (1) a jacketing ring mounting said guide ring therein, and
      (2) a plurality of legs having feet structurally adapted to be secured to the rod, two of said legs diverging radially of the rod from a single one of said feet, and extending past opposite sides of the centerline of said guide ring for a radial distance that exceeds the distance between said single one of said feet and the part of the jacketing ring most remote from said single one of said feet, and thence downwardly radially to said jacketing ring and joined thereto.

2. A line guide according to claim 1, a further one of said jacketing-ring-supporting legs having a slight convex curvature directed toward said two diverging legs.

3. A line guide according to claim 1, said two legs having a slight concave curvature directed toward said jacketing ring.

4. A line guide according to claim 3, a further one of said legs having a slight convex curvature directed toward said concave curvature.

* * * * *